United States Patent [19]
Jankovic

[11] Patent Number: 5,690,071
[45] Date of Patent: Nov. 25, 1997

[54] METHOD AND APPARATUS FOR IMPROVING THE PERFORMANCE OF A VARIABLE CAMSHAFT TIMING ENGINE

[75] Inventor: Mrdjan J. Jankovic, Birmingham, Mich.

[73] Assignee: Ford Global Technologies, Inc., Dearborn, Mich.

[21] Appl. No.: 741,063

[22] Filed: Oct. 28, 1996

[51] Int. Cl.⁶ .................................................. F02M 7/00
[52] U.S. Cl. ............................................................ 123/436
[58] Field of Search ............................ 123/436, 295; 364/431.68, 424.1

[56] References Cited

U.S. PATENT DOCUMENTS

| | | | |
|---|---|---|---|
| 5,239,473 | 8/1993 | Ribbens et al. | 364/431.08 |
| 5,278,760 | 1/1994 | Ribbens et al. | 364/424.1 |
| 5,331,933 | 7/1994 | Matsushita | 123/295 |
| 5,385,129 | 1/1995 | Eyberg | 123/436 |
| 5,561,600 | 10/1996 | McCombie | 364/431.08 |
| 5,576,963 | 11/1996 | Ribbens et al. | 364/431.08 |

Primary Examiner—Raymond A. Nelli
Attorney, Agent, or Firm—Allan J. Lippa; Roger L. May

[57] ABSTRACT

A method of compensating for torque variations resulting from camshaft motion in a variable camshaft timing system by adjusting the intake manifold mass air flow as a function of the camshaft schedule. The adjustment can be made using the air bypass valve, or by modifying the throttle command to an electronically controlled throttle if the vehicle is so equipped.

10 Claims, 6 Drawing Sheets

5,690,071

METHOD AND APPARATUS FOR IMPROVING THE PERFORMANCE OF A VARIABLE CAMSHAFT TIMING ENGINE

TECHNICAL FIELD

This invention relates to internal combustion engines using Variable Camshaft Timing (VCT) and, more particularly, to a method and apparatus for compensating the cylinder air charge variations caused by the camshaft motion in VCT systems.

BACKGROUND ART

Typically, the timing between the camshaft and crankshaft is rotationally fixed in conventional internal combustion engines. More recent engine designs have provided mechanisms to vary this timing, or relative phase angle between the camshaft and crankshaft, in order to maximize fuel economy and minimize emissions of NOx and HC, from the engine's exhaust, to increase the peak torque, and to improve fuel economy of the vehicles. An approach to phase shift control is disclosed in Maurer et al. U.S. Pat. No. 5,209,202, assigned to the assignee of the present invention and incorporated herein by reference. That phase shift control uses a hydraulic device which rotationally couples the camshaft drive sprocket to a camshaft flange. An engine control computer responds to continuously varying engine operating conditions and provides a control signal to the hydraulic device to set the desired relative phase angle for the condition existing at any point in time.

One characteristic of VCT is the large variation in cylinder air charge caused by the motion of the cam. In particular, the air charge drop during camshaft retard may result in a dip in torque response. In addition, the variation of the air charge affects the air/fuel ratio and may cause an increase in emissions above levels predicted by steady state analysis.

SUMMARY OF THE INVENTION

In accordance with the present invention, a method is provided for compensating the VCT induced air charge variation using an existing actuator, namely the air bypass valve, which is presently being used to regulate the idle speed of the engine. Electronically controlled throttle (ECT) can be used for the same purpose if the vehicle is so equipped.

BRIEF DESCRIPTION OF THE DRAWINGS

A more complete understanding of the present invention may be had from the following detailed description which should be read in conjunction with the drawings in which.

DETAILED DESCRIPTION OF PREFERRED EMBODIMENT

Figure 1:
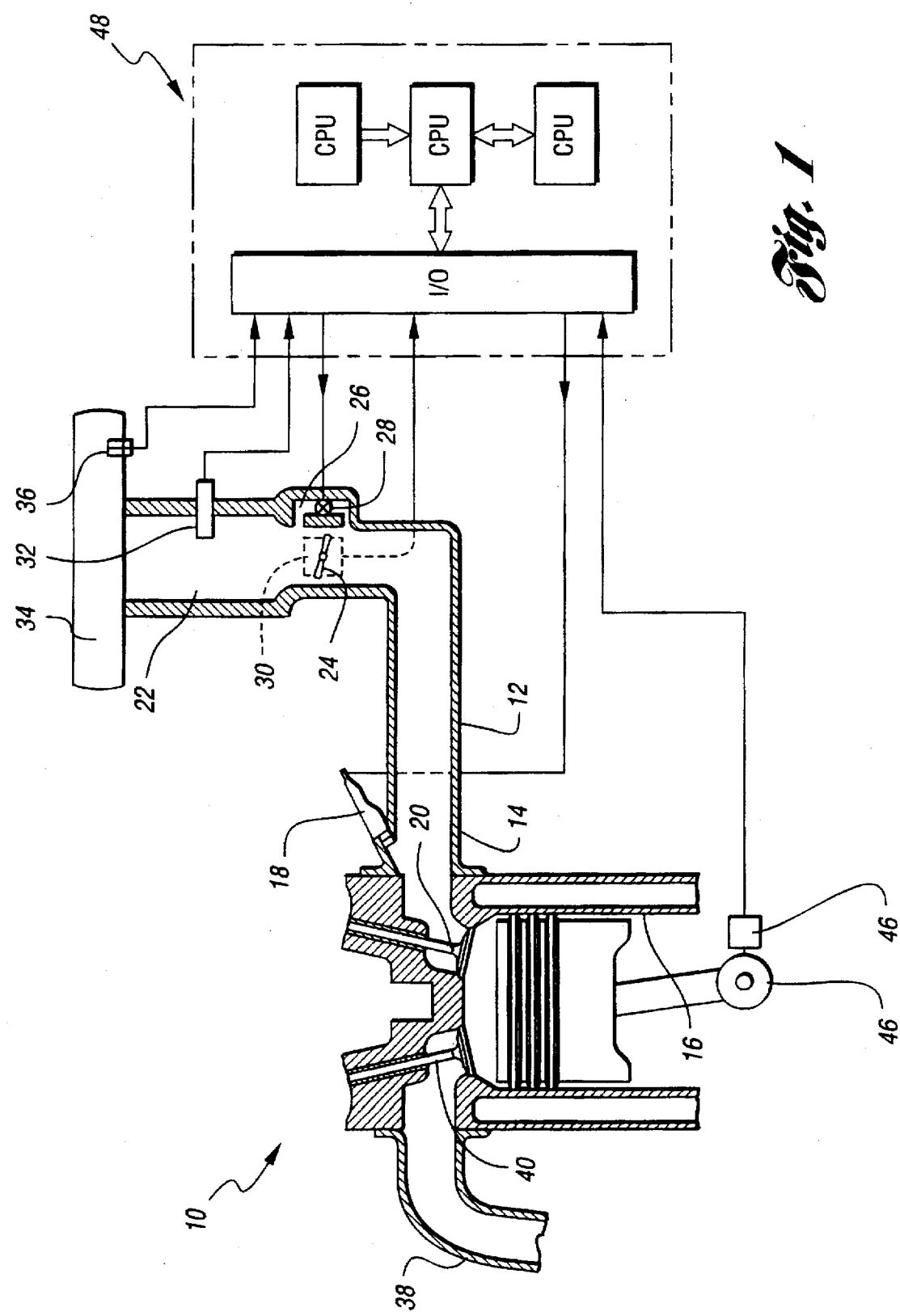
FIG. 1 shows an internal combustion engine schematically in cross-section.

Referring now to the drawings, and initially to FIG. 1, an internal combustion engine 10, to which the present invention is applied, is shown schematically in cross-section. The engine 10 includes an intake manifold 12 with a plurality of ports or runners 14 (only one of which is shown) which are individually connected to respective ones of a plurality of cylinders or combustion chambers 16 (only one of which is shown) of the engine 10. A fuel injector 18 is coupled to each runner 14 near an intake valve 20 of each respective chamber 16. The intake manifold 12 is also connected to an induction passage 22 which includes a throttle valve 24, a bypass passage 26 which leads around the throttle valve 24 and an air bypass valve 28. The valve 28 is used for example to control, among other things, the idle speed of the engine. A position sensor 30 is operatively connected with the throttle valve 24 for sensing the angular position of the valve. The induction passage 22 further includes a mass air flow sensor 32, such as a hot-wire air meter. The induction passage 22 also has mounted at its upper end an air cleaner system 34 which includes an inlet air temperature sensor 36. Alternatively, the sensor 36 could be mounted within the intake manifold 12. The engine 10 further includes an exhaust manifold 38 connected to each combustion chamber 16. Exhaust gas generated during combustion in each combustion chamber 16 is released into the atmosphere through an exhaust valve 40, the exhaust manifold 38 and a catalytic converter (not shown).

The crankshaft 44 of the engine 10 is operatively connected with a crank angle detector 46 which detects the rotational speed (N) of the engine 10. A computer 48, of conventional architecture includes ROM, RAM, CPU, and I/O. The ROM contains various engine control programs and in connection with the present invention stores a CAM schedule in the form of a look up table using throttle position entry points to determine the camshaft timing. The ROM also stores an air bypass valve schedule in the form of a look-up table using throttle position, RPM, and load entry points to determine the valve position. The computer 48 receives the various input signal and provides the various output control signals as indicated.

Figure 2:
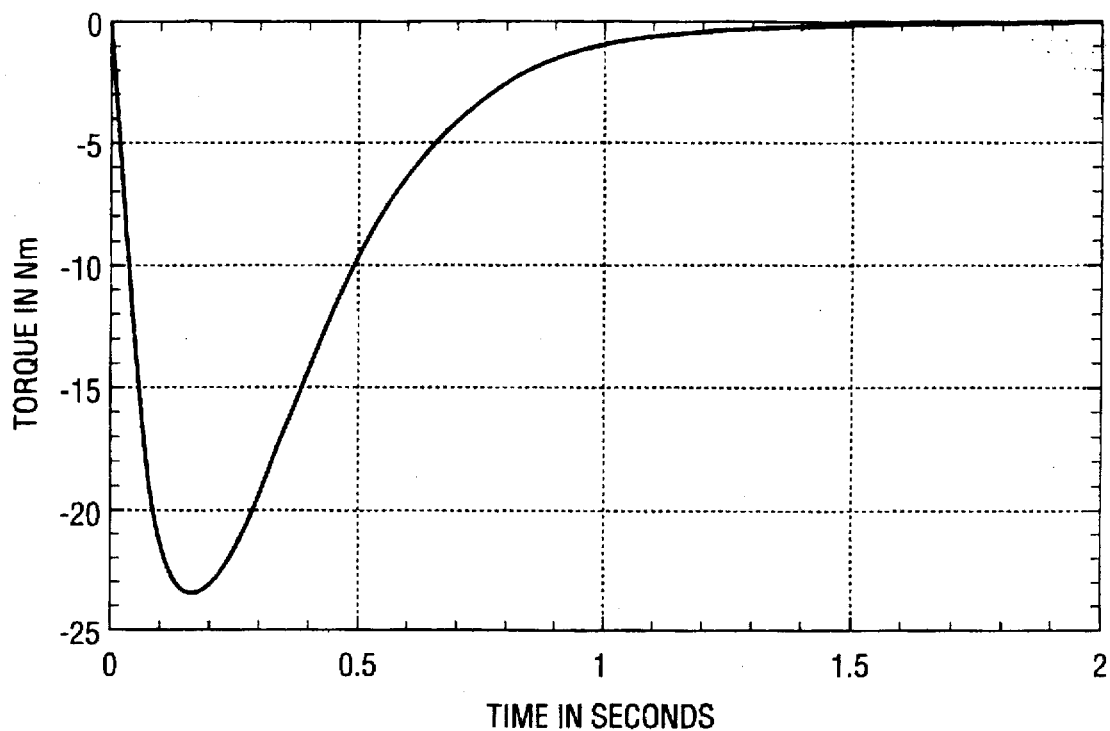
FIGS. 2 and 3 are plots showing engine torque response over time to a 10 degree camshaft retard at sonic and sub-sonic air flows, respectively.
Figure 3:
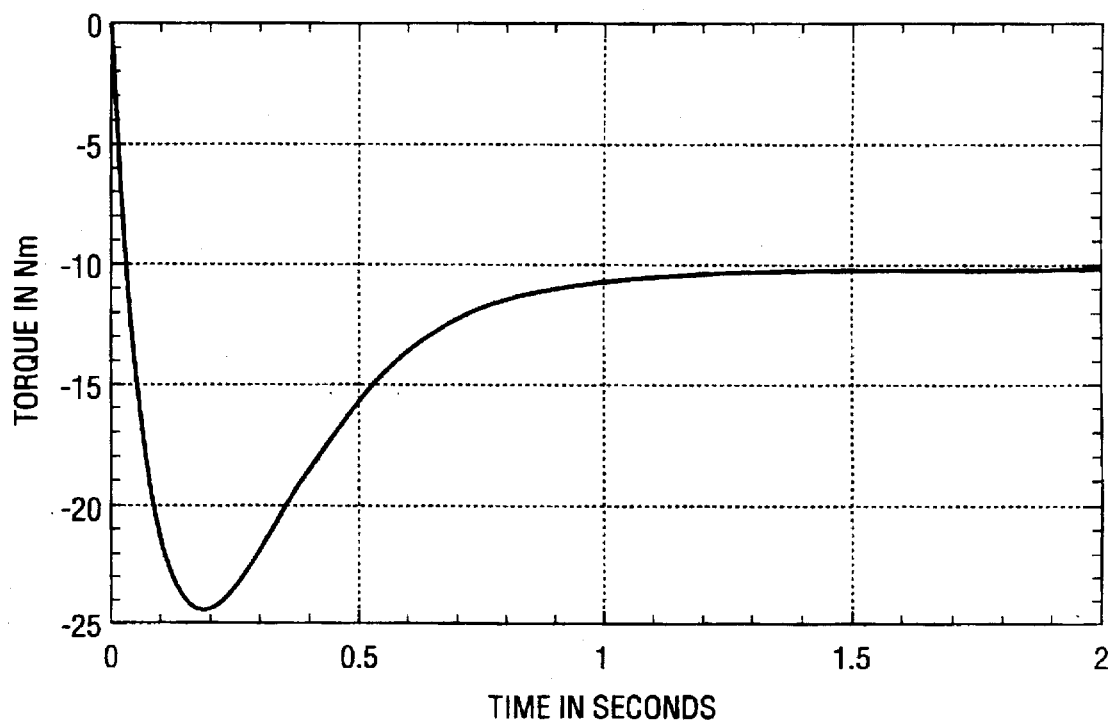

Referring now to the plots in FIGS. 2 and 3, when the camshaft command ($CAM_c$) is scheduled against the throttle, this may lead to a "non-minimum phase" response of the torque to the throttle command. The plots in FIGS. 2 and 3 show the engine torque response over time to a 10 degree camshaft retard at sonic and sub-sonic air flows, respectively into the intake manifold.

Figure 4:
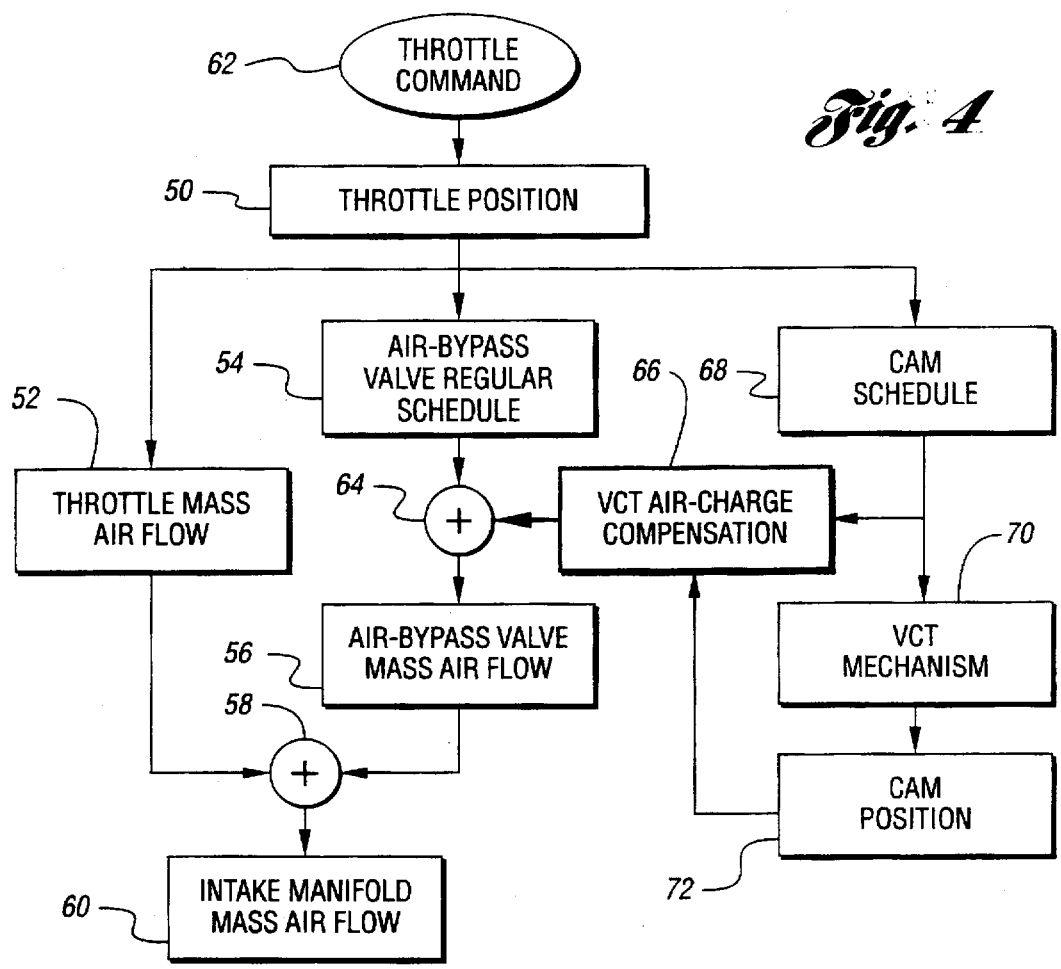
FIG. 4 is a block diagram showing the mass air flow compensation method of the present invention applied to an engine having an air bypass valve.

To improve the performance of a VCT engine, the air bypass valve (or electronic throttle control (ETC) if the vehicle is so equipped) is used in accordance with the present invention to offset the effect of the camshaft transient on the cylinder air charge. The modification of the air bypass valve strategy needed to accomplish this is depicted in the diagram in FIG. 4. The blocks 50–60 are typical for controlling intake manifold mass air flow in response to a throttle command 62 in systems using an air bypass valve. The engine throttle position represented at 50 results from the throttle command 62, and determines the throttle mass air flow 52. The air bypass valve regular schedule 54 is stored in computer ROM and produces a value in response to throttle position and other engine operating conditions to control, among other things, engine idle speed. A summer 64 is inserted between the blocks 54 and 56 and receives inputs values from the air bypass valve schedule and the VCT air charge compensation block 66. In the absence of compensation, the valve schedule 54 determines the air bypass valve mass air flow 56. The summer 58 combines of the mass air flow represented by blocks 52 and 56 to produce the intake manifold mass air flow 60.

The camshaft schedule block is a computer look-up table that produces an output command $CAM_c$ in response to the throttle command 62 and engine operating conditions. The output command $CAM_c$ controls the VCT mechanism represented by the block 70 which positions the camshaft represented by the block 72. The desired or commanded camshaft position, the actual camshaft position, and the engine operating conditions, provide inputs to the compensation block 66.

Figure 5:
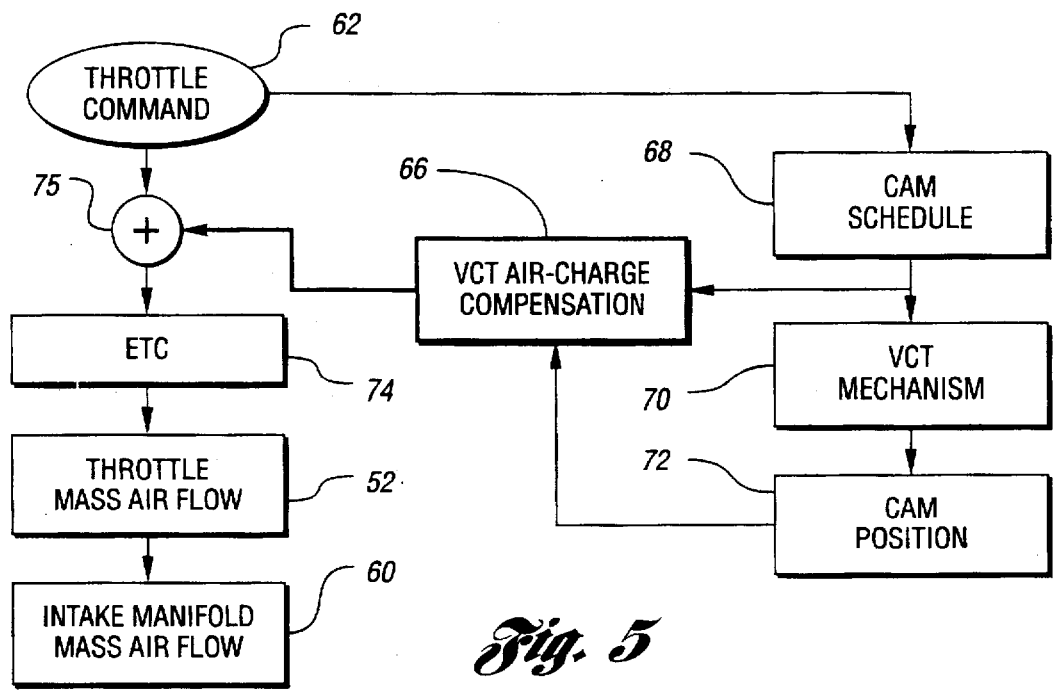
FIG. 5 is a block diagram showing the mass air flow compensation method of the present invention applied to an engine having an electronic throttle control.

In its simplest form, the VCT air charge compensator block 66 is represented by the following equation:

$$AIR = K \frac{sN_c(s)}{D_c(s)} CAM = K \frac{as}{s+a} CAM \qquad (1)$$

where s is the Laplace complex variable, and K is the gain depending only on the static map of the manifold filling dynamics. The rest of the compensator is an approximate differentiator applied to the CAM phase signal which means that the VCT compensation is active only during the transient of the cam. During steady state conditions the compensation variable AIR is zero. The variable, a, is the bandwidth of the compensator and may be scheduled on RPM and CAM. In general, the gain K is scheduled depending on the engine operating conditions, engine speed N, intake manifold pressure $P_m$, and camshaft position CAM. Compensation may also be based on the measured camshaft position and the camshaft position error (the difference between the cam-command and the actual camshaft position). FIG. 5 shows the VCT air charge compensation applied to an engine having an electronic throttle control represented by the block 74 that responds to the sum of the throttle command 62 and compensation value from the block 66 as combined by summer 75.

Figure 6:
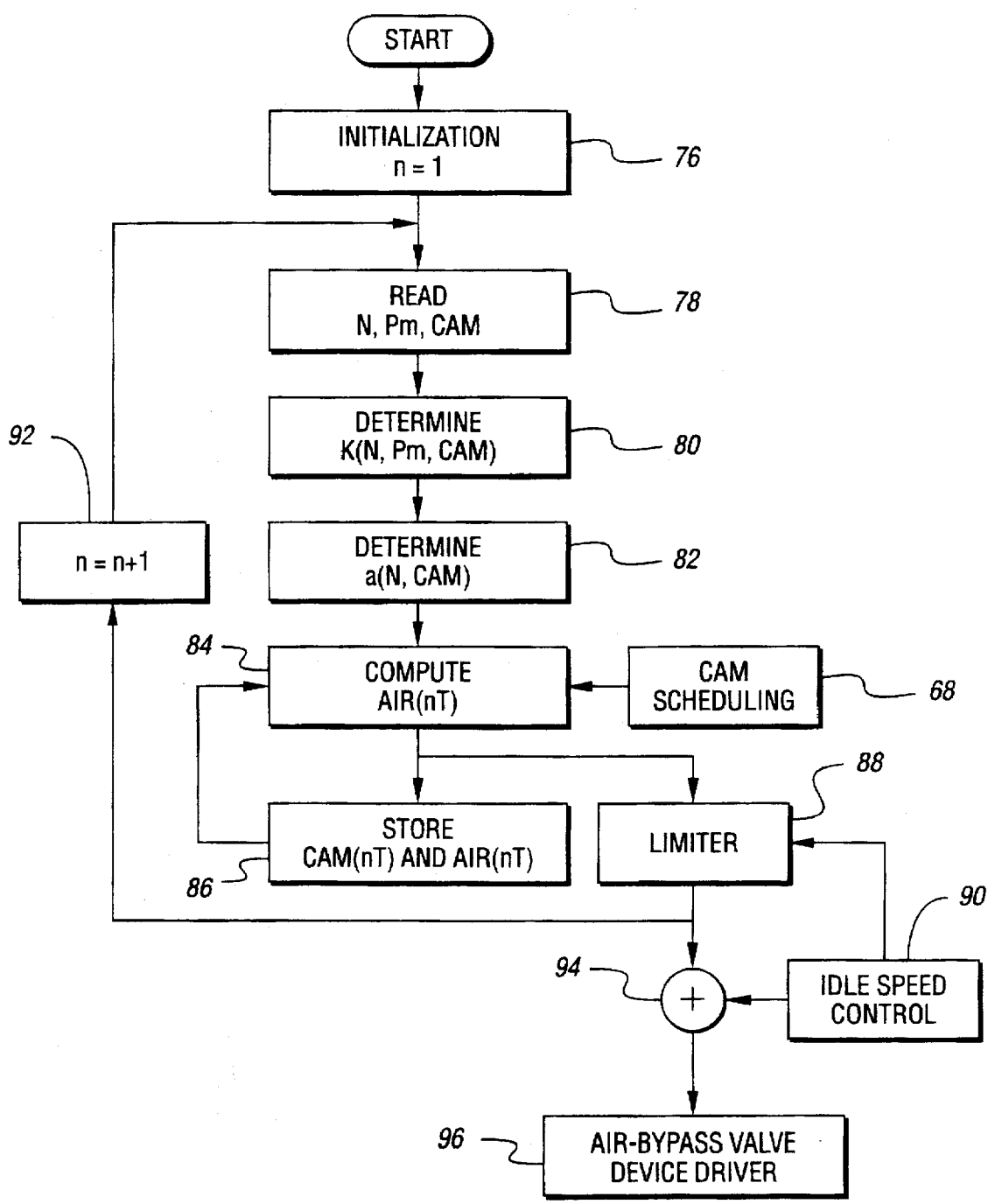
FIG. 6 is a flow diagram of the air charge compensation block shown in FIGS. 4 and 5.

One possible computer implementation of the air bypass valve air charge compensation is obtained by discretizing the equation (1) to obtain the value of the compensating variable at the time instant t=nT, T being the sampling time, as follows:

$$AIR(nT) = \frac{1}{1+Ta} AIR(nT-T) + \frac{aK}{1+Ta} (CAM(nT) - CAM(nT-T))^{(2)}$$

where t=nT–T denotes the previous time instant when the computation of the variable AIR has been performed. A flow diagram is depicted in FIG. 6. After initialization at block 76, engine speed N, intake manifold pressure $P_m$, and camshaft position CAM, are read at block 78 and the gain K and variable a are determined at blocks 80 and 82 respectively. In general, K=K(N, $P_m$, CAM), and a=a(N, CAM), that is the K and a are gain-scheduled. Computation of the variable AIR is performed at block 84 in accordance with equation (2) and the variables are stored at block 86 for subsequent use during succeeding sampling time intervals. For some engine operating conditions, the variable AIR may have to be limited, as indicated at block 88, dependent on idle speed control, as indicated at 90 (for example, to prevent the air bypass valve from completely closing during camshaft advance at closed throttle). After computation of the variable AIR, and possible limiting thereof, n is incremented at 92 and the loop is repeated. The computed value of AIR is added to the idle speed control value at 94 and used to control the air bypass valve device driver 94 to properly position the valve to compensate for the effect of the camshaft timing.

Figure 7:
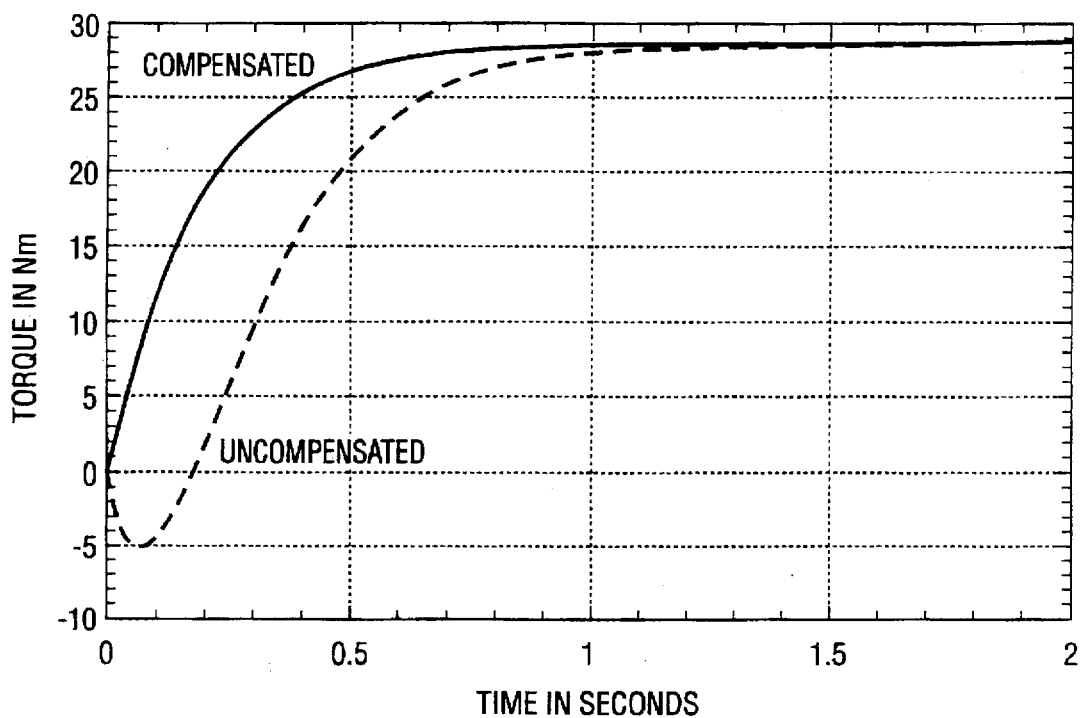
FIG. 7 compares the uncompensated torque response to a 10 degree throttle step with the torque response using air charge compensation.
Figure 8:
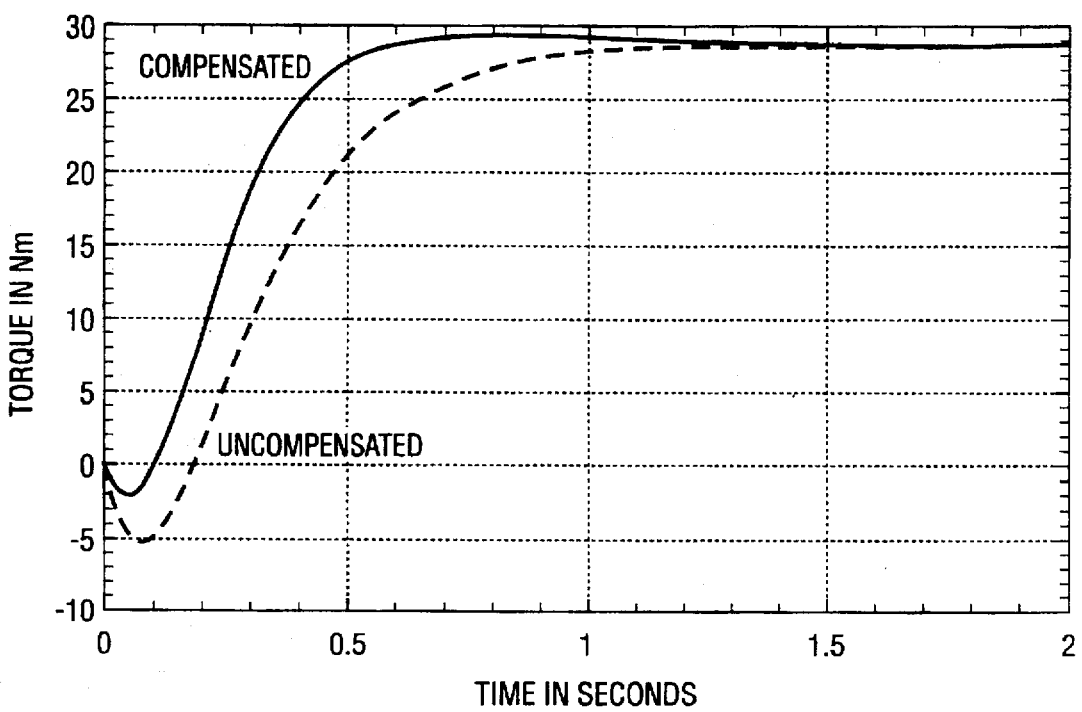
FIG. 8 compares the uncompensated torque response with a de-tuned/saturated compensator in accordance with the present invention.

Plots in FIGS. 7 and 8, marked "uncompensated," show the effect of the VCT on the torque response to a 10° throttle step with the camshaft scheduled versus the throttle position. In this example, a dip in torque which is due to the camshaft transient is clearly visible. FIG. 7 also shows the torque response of the compensated system. For the ideal compensation, the actuator (air bypass valve or ETC) must have sufficient flow rate capability and bandwidth close to that of the VCT mechanism. However, the benefits of compensation are obvious even when these conditions are not satisfied as shown in FIG. 8 where a non-ideal compensator is used with the high frequency gain reduced by 45%, time constant increased by 35%, and, in addition, its output saturated to the equivalent of 3° throttle.

Figure 9:
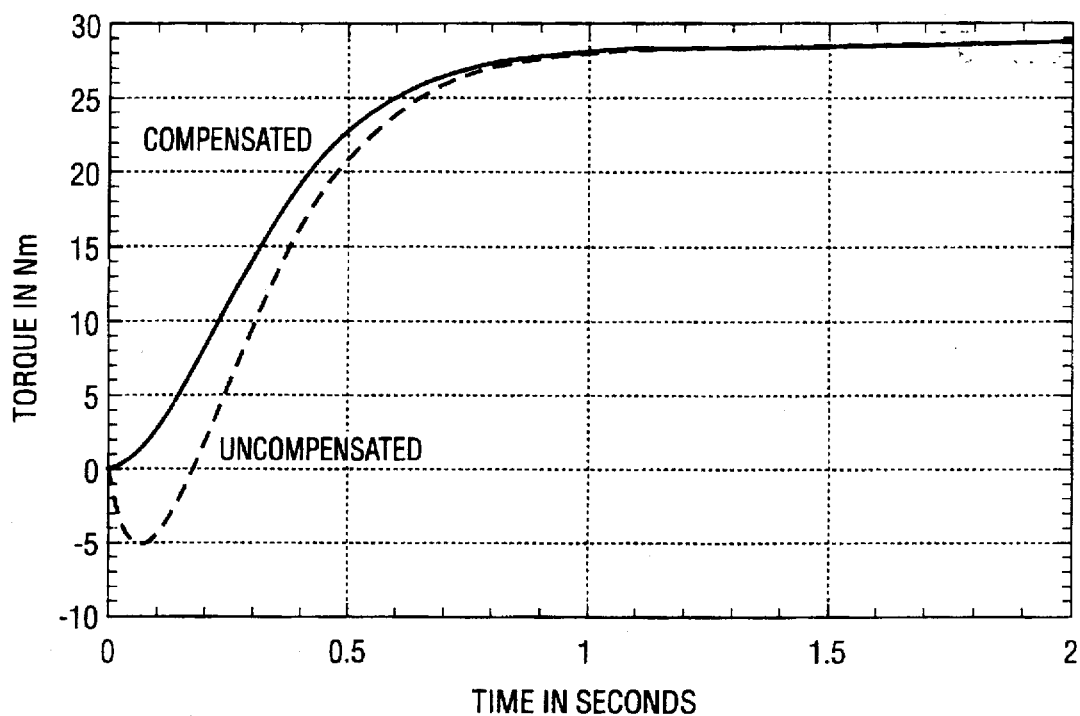
FIG. 9 shows the torque response of the compensated and uncompensated system where the difference in the mean square manifold mass air flow rates during the interval from 0 to 1 second is only 2.7%.
Figure 10:
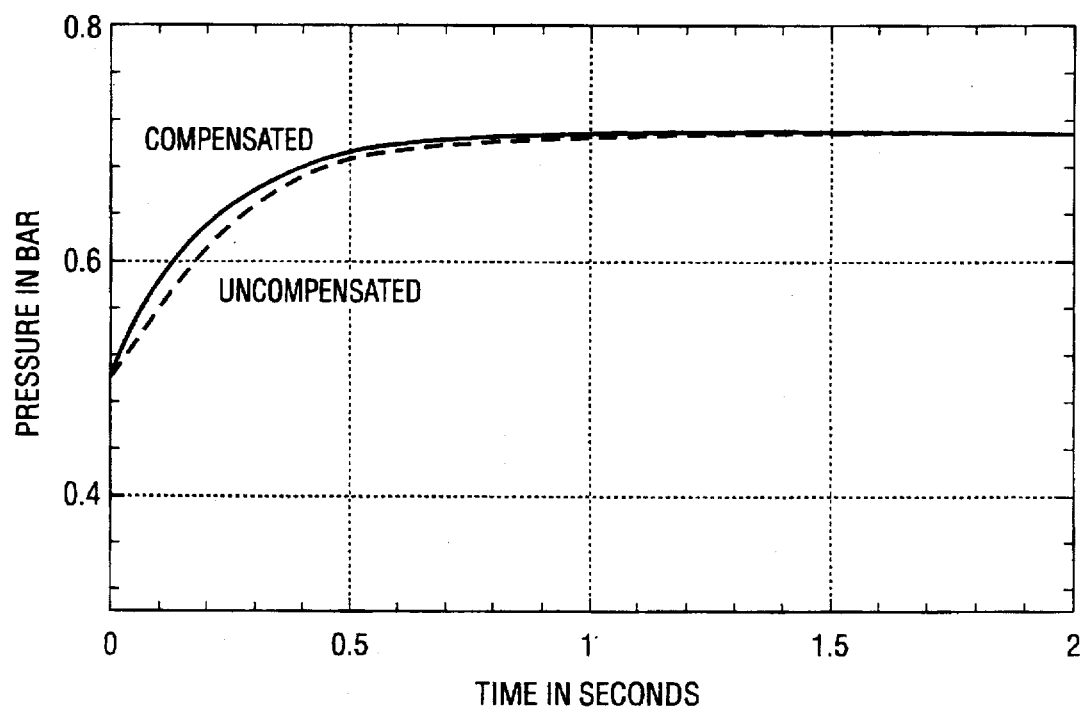
FIG. 10 show the plots of compensated and uncompensated manifold pressure in response to a 10 degree throttle step.

The VCT air charge compensator can be tuned to minimize the actuation in the mean square sense. The plot in FIG. 9 shows the response of the compensated and uncompensated system where the difference in the mean square manifold mass air flow rates during the interval from 0 to 1 second is only 2.7%. The corresponding manifold pressure ($P_m$) plots are shown in FIG. 10.

While the best mode for carrying out the present invention has been described in detail, those familiar with the art to which this invention relates will recognize various alternative designs and embodiments for practicing the invention as defined by the following claims.

What is claimed is:

1. A control method of compensating air charge variation in an engine caused by camshaft transients produced by a variable camshaft timing mechanism comprising a sequence of the following steps:
    calculating an air charge compensation value based on a cam schedule and engine operating conditions;
    adjusting the intake manifold mass air flow as a function of said compensation value to thereby reduce said variation.

2. The method of claim 1 where said compensating value calculation is based on:

$$AIR = K \frac{as}{s+a} CAM$$

where K depends on engine speed, intake manifold pressure, and camshaft position,
    a is the bandwidth,
    s is the Laplace complex variable, and
    CAM is camshaft position.

3. The method of claim 1 further comprising the step of adjusting said compensation value as a function of the difference between a cam command and the actual camshaft position.

4. The method of claim 1 wherein said engine has an electronic throttle control device and the air charge compensation value is combined with the throttle command as an input to said electronic throttle control device.

5. The method of claim 1 wherein said engine has an air bypass valve and said air charge compensation value modifies the bypass valve position.

6. An apparatus for an internal combustion engine with a variable cam timing mechanism comprising:

a throttle body coupled to an intake manifold of the engine;

a bypass air passageway coupled to said throttle body via an electronically controllable bypass valve;

an air flow meter coupled to said throttle body upstream of said passageway to provide a single measurement of air inducted through both said throttle body and said bypass air passageway into said intake manifold;

an air/fuel controller delivering fuel to the intake manifold in relation to said inducted air measurement to obtain a desired air/fuel ratio;

said air/fuel controller increasing air flow through said bypass air passageway to compensate for air charge variations caused by camshaft transients resulting from operation of said mechanism.

7. The apparatus recited in claim 6 wherein said amount of bypass air flow increase is determined in accordance with an air charge compensation value in the form where K depends on engine speed, intake manifold pressure, and camshaft position, $$AIR = K \frac{as}{s+a} CAM$$

a is the bandwidth,
s is the Laplace complex variable, and
CAM is camshaft position.

8. The apparatus recited in claim 7 wherein said amount of bypass air flow increase is adjusted as a function of the difference between a cam-command and the actual camshaft position.

9. An apparatus for an internal combustion engine with a variable cam timing mechanism comprising:

a throttle mass air flow control mechanism responsive to a throttle command;

an air flow meter providing a measurement of intake manifold mass air flow;

an air/fuel controller delivering fuel to the intake manifold as a function of said intake manifold mass air flow;

said air/fuel controller adjusting said throttle command to compensate for air charge variations caused by camshaft transients resulting from operation of said mechanism.

10. An electronic memory containing a computer program to be executed by an engine controller that controls an engine having a variable cam timing mechanism and an electronically controllable air bypass valve, comprising:

air bypass valve scheduling means containing bypass scheduling data associated with engine operating conditions;

cam scheduling means containing camshaft timing data based on engine operating conditions;

said program including code for causing said controller to develop an air flow compensation value based on data contained in said cam scheduling means;

said program further including code for causing said controller to develop an air bypass valve control value equal to the sum of said compensation value and an air bypass valve scheduled value obtained from said bypass valve scheduling means.

* * * * *